UNITED STATES PATENT OFFICE.

NICHOLAS AVERY, OF BOSTON, MASSACHUSETTS.

COATING METALLIC ARTICLES WITH VULCANIZED RUBBER.

SPECIFICATION forming part of Letters Patent No. 264,121, dated September 12, 1882.

Application filed August 12, 1882. (No specimens.)

*To all whom it may concern:*

Be it known that I, NICHOLAS AVERY, a citizen of the United States, residing at Boston, in the county of Suffolk and State of Massachusetts, have invented an Improvement in Coating Metallic Articles with Vulcanized Rubber; and I hereby declare that the following is a full, clear, and exact description of the same.

My invention relates particularly to an improvement in the manufacture of rubber rolls for clothes-wringing machines and other metallic articles coated with vulcanized rubber, and has for its object to dispense with the polishing, finishing, or galvanizing of the metallic surface previous to coating, as heretofore customary, and also to produce a perfect and tenacious adhesion of the rubber to the metallic surface in a quicker, simpler, and less expensive manner than has hitherto been found possible; and my invention consists in the process or method of effecting the desired result, as will be hereinafter described.

The iron wringer, roll-shaft, or other metallic article to be coated with vulcanized rubber is first subjected in a suitable retort or closed chamber to the action of live steam at a pressure of from sixty to one hundred pounds to the square inch for from one to three hours, when it is removed and wiped with a coarse woolen cloth, which causes its surface to be thoroughly cleansed from all grease, scales, rust, or other impurities. Instead, however, of employing steam for this operation, the cleansing of the metal may be effected by dipping it into sulphuric acid and allowing it to remain therein for a few minutes and afterward wiping it dry with a coarse woolen cloth. I now take twelve pounds of a rubber cement composed of twelve parts of fine Para rubber, sixteen parts of oxide of zinc, and one part of sulphur, mixed and incorporated together with a suitable quantity of naphtha to give it the desired consistence, and thoroughly mix therewith twelve pounds of white lead, adding at the same time a sufficient quantity of naphtha to reduce the entire mass to about the consistence of thin paste. I now apply, by means of a brush or otherwise, to the metallic surface, cleansed as above described, one or more coats of the liquid composition above described and allow it to stand until partially dry, when the vulcanizable rubber compound is applied in the ordinary way to the metallic surface thus coated and vulcanized thereon in the usual manner.

The above-described process enables me to entirely dispense with the polishing, galvanizing, or turning down of the surface of the metal previous to coating, as has heretofore been common, and which materially increases the cost of the article, for the reason that my improved liquid coating composition is caused by the action of the heat to which the article is subjected in the vulcanizing process to adhere with the greatest tenacity directly to the rough or unfinished surface of the metal, and to the vulcanized rubber compound thereon, as the ingredients of the liquid coating composition, when subjected to the vulcanizing-heat, readily unite with the vulcanizable rubber compound, and also have a peculiar affinity for the metallic surface on which it is placed, and consequently a very strong, perfect, and permanent adhesion of the rubber compound to the metal is secured in an exceedingly quick, simple, and inexpensive manner, and the liability of the rubber becoming separated or loosened from the metal to which it is applied entirely avoided, thus rendering my invention particularly applicable to the manufacture of wringing-machine rolls.

I do not wish to confine myself to the exact proportions of the ingredients above described, as they may be varied to some extent without departing from the spirit of my invention.

What I claim as my invention, and desire to secure by Letters Patent, is—

1. The herein-described process of coating metallic articles with vulcanized rubber, the same consisting in first cleansing the surface of the metal, as described, then applying thereto one or more coats of a composition formed of a rubber cement composed of Para rubber, oxide of zinc, sulphur, and naphtha, having mixed therewith white lead and naphtha, substantially in the proportions specified, and finally applying the vulcanizable rubber compound and vulcanizing the same, as set forth.

2. As a new article of manufacture, a wringer-roll or other metallic article coated with rubber formed by first cleansing the surface of the metal, as described, then applying thereto one or more coats of a composition formed of a rubber cement composed of Para rubber, oxide of zinc, sulphur, and naphtha, having mixed therewith white lead and naphtha, substantially in the proportions specified, and finally applying thereto the desired quantity of vulcanizable rubber compound and vulcanizing the same, substantially as and for the purpose described.

3. In a wringer-roll or other metallic article coated with vulcanized rubber, the combination, with a metallic surface, cleansed as described, of a composition formed of a rubber cement composed of Para rubber, oxide of zinc, sulphur, and naphtha, having mixed therewith white lead and naphtha, substantially in the proportions specified, united therewith by the action of the heat to which the article is subjected in the vulcanizing process, and a covering or coating of rubber compound vulcanized thereon, substantially as and for the purpose set forth.

4. In the process of coating metallic articles with vulcanized rubber, the employment of a composition formed of a rubber cement composed of Para rubber, oxide of zinc, sulphur, and naphtha, having mixed therewith white lead and naphtha, substantially in the proportions specified, for firmly uniting the vulcanizable rubber compound to a metallic surface previously cleansed, when the article is subjected to heat in the vulcanizing process, substantially as described.

Witness my hand this 11th day of August, A. D. 1882.

NICHOLAS AVERY.

In presence of—
P. E. TESCHEMACHER,
W. J. CAMBRIDGE.